(12) United States Patent
Yoneda (10) Patent No.: US 7,336,424 B2
(45) Date of Patent: Feb. 26, 2008

(54) GLASS OPTICAL ELEMENT

(75) Inventor: Yasuhiro Yoneda, Iida (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/744,965

(22) Filed: May 7, 2007

(65) Prior Publication Data

US 2007/0206290 A1 Sep. 6, 2007

Related U.S. Application Data (62) Division of application No. 11/055,519, filed on Feb. 11, 2005.

(30) Foreign Application Priority Data

Feb. 12, 2004 (JP) ............... 2004-34504

(51) Int. Cl.
*G02B 3/00* (2006.01)

(52) U.S. Cl. ............... 359/642; 359/719; 369/112.23; 65/378

(58) Field of Classification Search ............... 359/642, 359/708, 718, 719; 369/112.01, 112.23; 65/102, 378
See application file for complete search history.

(56) References Cited

U.S. PATENT DOCUMENTS

2002/0027863 A1* 3/2002 Kikuchi et al. ........ 369/112.24

FOREIGN PATENT DOCUMENTS

| CN | 1409148 A | 4/2003 |
|---|---|---|
| JP | 6-9228 A | 1/1994 |
| JP | 8-245224 A | 9/1996 |
| JP | 8-325023 A | 12/1996 |
| JP | 11-236226 A | 8/1999 |
| JP | 2000-128550 A | 5/2000 |

* cited by examiner

*Primary Examiner*—Hung X. Dang
*Assistant Examiner*—Joseph Martinez
(74) *Attorney, Agent, or Firm*—Sughrue Mion, PLLC (57) ABSTRACT

In a method of manufacturing a glass optical element by press-forming a glass material in a chamber by using a forming mold comprising upper and lower dies at least one of which is movable, where a surrounded space is formed between the glass material and at least one of the upper and the lower dies when the upper and the lower dies come into contact with the glass material, a pressure within the chamber is reduced before the glass material placed in the forming mold is heated to a press-forming temperature. After sealing the space as formed when the glass material is in contact with at least one of forming surfaces of the upper and the lower dies, a gas is introduced into the chamber. The glass material is heated in the gas and then press-formed under a pressing load.

8 Claims, 5 Drawing Sheets

GLASS OPTICAL ELEMENT

This is a divisional of application Ser. No. 11/055,519 filed Feb. 11, 2005. The entire disclosure(s) of the prior application(s), application Ser. No. 11/055,519 is considered part of the disclosure of the accompanying divisional application and is hereby incorporated by reference.

This invention claims priority to prior Japanese patent application JP 2004-34504, the disclosure of which is incorporated herein by reference.

BACKGROUND OF THE INVENTION

This invention relates to a method and an apparatus for producing an optical element, such as a lens, made of an optical glass and, in particular, to a method and an apparatus for producing a glass optical element by press-forming or press-molding a heated and softened glass material with high accuracy using a forming mold or die precisely shaped in conformity with a desired shape of the optical element. This invention also relates to a glass optical element Produced by the method and the apparatus.

Figure 1:
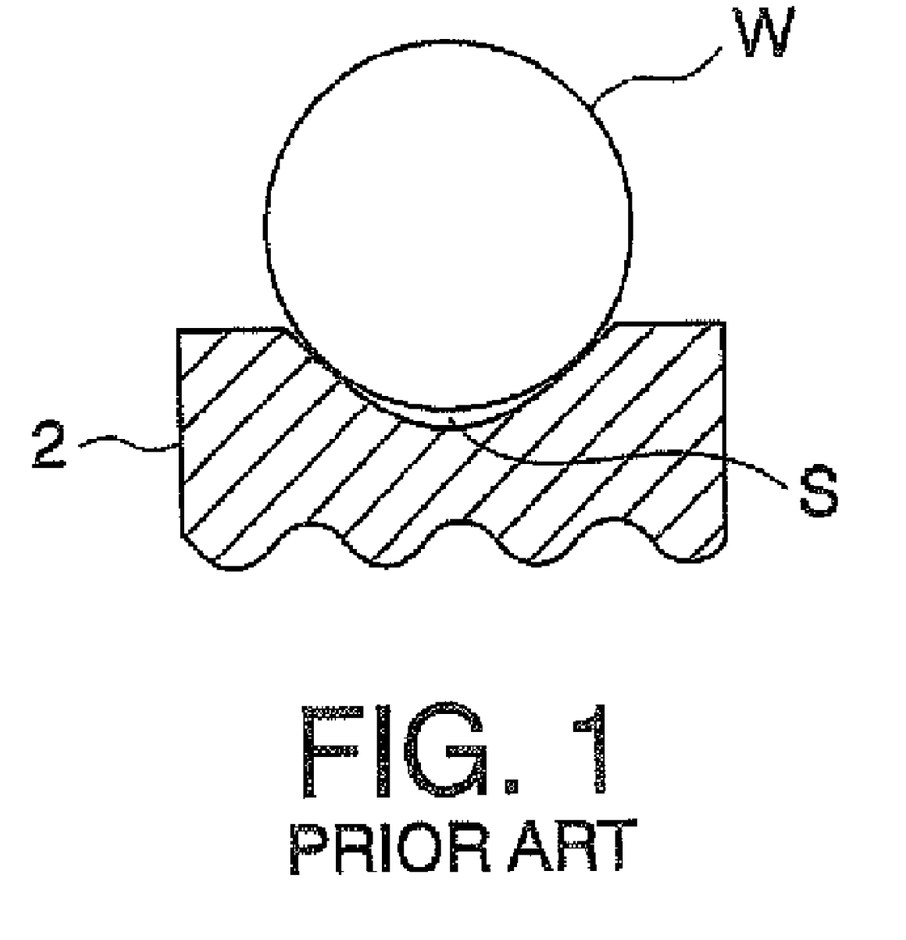
FIG. 1 is a schematic diagram showing a state where a space is formed between a glass material and a forming mold.

In order to produce an optical element, such as an optical glass lens, for use in an optical apparatus such as a camera and an optical pickup, proposal has recently been made of a number of methods in which a heated and softened glass material is press-formed or press-molded by the use of a forming mold made of metal or ceramics. In this case, use may be made of glass materials (i.e., preforms preliminarily shaped) in various shapes, such as a spherical shape, a rod-like shape, and a flattened spherical shape, in case where the glass materials of these shapes are used to form optical elements, there may arise a problem which will presently be described. Referring to FIG. 1, depending upon the relationship between the shape of a glass material W and the shape of the forming mold, i.e., the shape of an optical element to be formed (for example, if a radius of curvature of the glass material W is greater than a paraxial radius of curvature of a forming surface of the forming mold), a space S may sometimes be formed between a lower die 2 and the glass material W. If press-forming is carried out in a state where a gas trapped in the space S is not discharged, a glass surface of the optical element obtained by press-forming undesirably has a recess, called a gas trap mark, formed at a portion corresponding to the space S where the gas remains trapped. As a result, optical performance and surface quality of the optical element obtained by press-forming are adversely affected.

In order to remove the above-mentioned problem, various conventional techniques have been proposed as follows.

Japanese Unexamined Patent Application Publication (JP-A) No. H6-9228 (Reference 1) discloses a forming method comprising the steps of press-forming an approximate half of a total deformation amount by heating and pressing a material with a pressing pressure reduced or released at least once during heating and thereafter press-forming the rest of the total deformation amount by cooing and pressing the material.

Japanese Unexamined Patent Application Publication (JP-A) No. H8-325023 (Reference 2) discloses a method in which, upon press-forming a flattened glass material, a gas present between a forming surface and the glass material is allowed to escape outward through a groove or a protrusion formed at a topmost portion of an outer periphery of the forming surface.

Japanese Unexamined Patent Application Publication (JP-A) No. H11-236226 (Reference 3) discloses a method in which a forming chamber is evacuated in a pressing step.

Japanese Unexamined Patent Application Publication (JP-A) No. H8-245224 (Reference 4) discloses a method in which, immediately before a heated and softened glass material is press-formed, a space around the glass material is reduced in pressure.

However, the above-mentioned methods are disadvantageous in the following respects.

In the method disclosed in Reference 1, the pressing pressure is reduced or released during heating so that the gas trapped in the space is returned into a normal pressure. In this method, however, the gas tends to remain trapped in the space depending upon the shape or the volume of the space. In order to completely discharge the gas, the pressing pressure must be repeatedly increased and decreased. In addition, mold release at a press-forming temperature may cause glass fusion or defective appearance of an optical element obtained by press-forming.

In the method disclosed in Reference 2, the groove or the protrusion is formed at the topmost portion of the outer periphery of the forming surface to allow the gas present between the forming surface and the glass material to escape outward. In this method,however, the shape of the groove or the protrusion is transferred onto the optical element obtained by press-forming. As a result, the optical element has a deformed part, for example, at an attaching portion to be attached to an optical apparatus. In some cases, a post-processing step of removing the deformed part is required.

In the method disclosed in Reference 3, heating is carried out after evacuating the forming chamber to discharge the gas trapped in the space. In this method, however, it is impossible to utilize heat conduction through an atmospheric gas in the forming chamber as a medium in order to heat the forming die and the preform because the forming chamber is evacuated into vacuum. As a result, heating efficiency is insufficient. In addition, heat-soaking to bring the die and the preform to uniform temperature is difficult and temperature control is unstable.

In the method disclosed in Reference 4, the glass material is heated to a temperature not lower than a softening point and thereafter transferred by a conveying member to a position between upper and lower dies. After the space around the glass material is reduced in pressure, the glass material is press-formed. In this method, the glass material is transferred to the position between the upper and the lower dies after the glass material is heated to the temperature adapted to press-forming. As a result, the glass material has a low viscosity and is inevitably deformed to trap the gas between the glass material and the lower die after the glass material is transferred. Therefore, the gas can not be purged or removed even if pressure reduction is performed thereafter.

Thus, in the above-mentioned conventional methods described in References 1 to 4, it is impossible to completely purge the gas from the space between the forming mold and the preform.

In the meanwhile, in an optical pickup for use with an optical information recording medium to record and/or reproduce information, an objective lens having higher resolution is required with an increase in recording density. Therefore, in the optical pickup, it is required to use a light source having a short wavelength and an objective lens having a large numerical aperture (NA). Also as a coupling lens for optical communication, a high-NA lens is required in order to improve coupling efficiency.

In the high-NA lens, however, a surface tilt angle (an angle formed between a normal to a lens surface and an optical axis) tends to be large at its periphery. For example, the surface tilt angle may exceed 40°, sometimes may be as large as 50° to 63°. In addition, a lens useful as the high-NA lens tends to have a small paraxial radius of curvature. Further, in order to assure a production tolerance or to reduce wavefront aberration, the high-NA lens may be increased in center thickness. As a result, the glass material is increased in volume.

For example, in case where the preform as the glass material has a spherical shape, RM/RL is greater than i and has a value within a range of $1.0 < RMIRL \leq 1.6$, in particular, $1.1 \leq RM/RL \leq 1.6$, where RM represents a radius of curvature of the glass material and RL represents a paraxial radius of curvature of the lens (paraxial radius of curvature of the forming surface of the forming mold). Thus, the glass material is increased in volume within a range such that an outer diameter of the glass material does not exceed an outer diameter of the lens. If the lens of such a shape is formed, a space is inevitably formed between the forming surface and the glass material.

However, even in case where RM/RL is large as mentioned above, it is required to form a lens excellent in optical performances and surface quality.

SUMMARY OF THE INVENTION

It is an object of this invention to provide an apparatus and a method which are capable of producing a glass optical element excellent in surface quality without a residual gas mark (hereinafter called a gas trap mark) even if a space allowing presence of a residual gas could be formed between a forming mold and a glass material (preform).

In order to achieve the above-mentioned object, this invention provides an apparatus for manufacturing a glass optical element by press-forming a glass material under a pressing load, the apparatus comprising a forming mold including an upper die and a lower die at least one of which is movable, a load applying device for applying a load on at least one of the upper and the lower dies to bring forming surfaces of the upper and the lower dies into contact with the glass material, which load is smaller than the pressing load, a chamber for confining the forming mold, a heater for heating the forming mold, a sucking device for sucking a gas from the chamber, and a gas supplier for supplying a gas into the chamber.

Preferably, the load applying device comprises a spring member. For example, when the upper die is to be brought into contact with the glass material with a load smaller than the pressing load, the spring member, which could be interposed between the upper die and an upper die supporting member, can be used. Preferably, the apparatus has a cap member interposed between the upper die and the upper die supporting member and provided with a protrusion formed at its upper end and adapted to be brought into point contact with the upper die supporting member.

With the apparatus having the above-mentioned structure, even under the condition where, due to the relationship of shapes of the forming mold and the glass material, a space is formed between the forming mold and the glass material when they are in contact, it is possible to seal the space by applying a load on the pressing mold as the pressure of the space is reduced, supply an atmospheric gas thereafter, and perform heating or heat-soaking in the presence of the gas and press-forming. Thus, by the use of the simple apparatus, it is possible to produce an optical element high in accuracy without a gas trap mark.

When the pressing load is applied, preferably, the upper die is pressed via the cap member provided with the protrusion formed at its upper end. Therefore, it is possible to obtain an optical element excellent in accuracy of eccentricity.

According to this invention, there is also provided a method of manufacturing a glass optical element by press-forming a glass material in a chamber by using a forming mold comprising an upper die and a lower die at least one of which is movable, where a surrounded space is formed between the glass material and at least one of the upper die and the lower die when the upper die and the lower die come into contact with the glass material, the method comprising placing the glass material in the forming mold, reducing a pressure within the chamber before the glass material placed in the forming mold is heated to a press-forming temperature, sealing the space as formed when the glass material is in contact with at least one of forming surfaces of the upper and the lower dies, introducing a gas into the chamber, heating the glass material in the gas, and press-forming the glass material under a pressing load.

Placing the glass material refers to placing it on the lower die. At this stage, upper die may or may not be brought in contact with the glass material. Reducing the pressure within the chamber can be carried out when the space is formed between at least one of the upper die and the lower die and the glass material, so that the gas in the space is discharged. In this respect, in a case that the space is formed between the upper die and the glass material, reducing the pressure within the chamber can be carried out when the upper die and the glass material are in contact to form the space so that the gas is discharged from the space, or also be carried out when they are not in contact.

Preferably, the above-mentioned method further comprises heating the glass material to a predetermined temperature lower than the press-forming temperature prior to reducing the pressure.

In the above-mentioned method, sealing the space includes applying a load smaller than the pressing load to the glass material by the forming mold.

The press-forming temperature according to the present invention is the temperature appropriate to deform the glass material into the shape of the optical element. Such temperature can be selected according to the composition of the glass or the desired shape of the optical element.

Preferably, the press-forming temperature corresponds to a glass viscosity within a range not lower than $10^6$ dPa·s and lower than $10^{8.5}$ dPa·s.

In the meantime, heating the glass material in the gas includes heat-soaking the glass material to bring the glass material to uniform temperature.

Preferably, sealing the space comprises discharging a gas from the space as formed when the glass material is in contact with at least one of forming surfaces of the upper and the lower dies.

When the relationship RM/RL>1.0 is satisfied where RM represents a radius of curvature of the glass material and RL represents a paraxial radius of curvature of one of surfaces of the glass optical element, the effect of the invention is particularly remarkable.

With the above-mentioned method, it is possible to reliably produce an optical element high in accuracy without a gas trap mark.

A glass optical element according to this invention may be an objective lens having a numerical aperture NA of 0.7 or more and a total wavefront aberration WFE of 0.06 ξrms at a usable wavelength of 380-410 nm.

According to this invention, there is provided a glass optical element having a first surface and a second surface as curved surfaces, the glass optical element having a volume V and satisfying the relationship RM'/RL>1.0 where RL represents a paraxial radius of curvature of the first or the second surface and RM' is a value satisfying $(4/3)\pi(RM')^3=V$, wherein a gas trap mark which may be formed In the vicinity of a surface of the glass optical element is not greater in diameter than 200 μm.

The above-mentioned glass optical element does not have the gas trap mark degrading optical performance and, therefore, can be used as a high-accuracy objective lens for use with an optical information recording medium to record or reproduce information.

As described above, by the method of producing a glass optical element according to this invention, it is possible to discharge the trapped gas from the space formed between the glass material and the forming mold and to hermetically seal the space thereafter without adversely affecting the shape of the glass optical element. Moreover, it is possible to efficiently heat and heat-soak the glass material in the atmospheric gas.

DESCRIPTION OF PREFERRED EMBODIMENTS

Now, description will be made of preferred embodiments of this invention with reference to the drawing.

Figure 2:
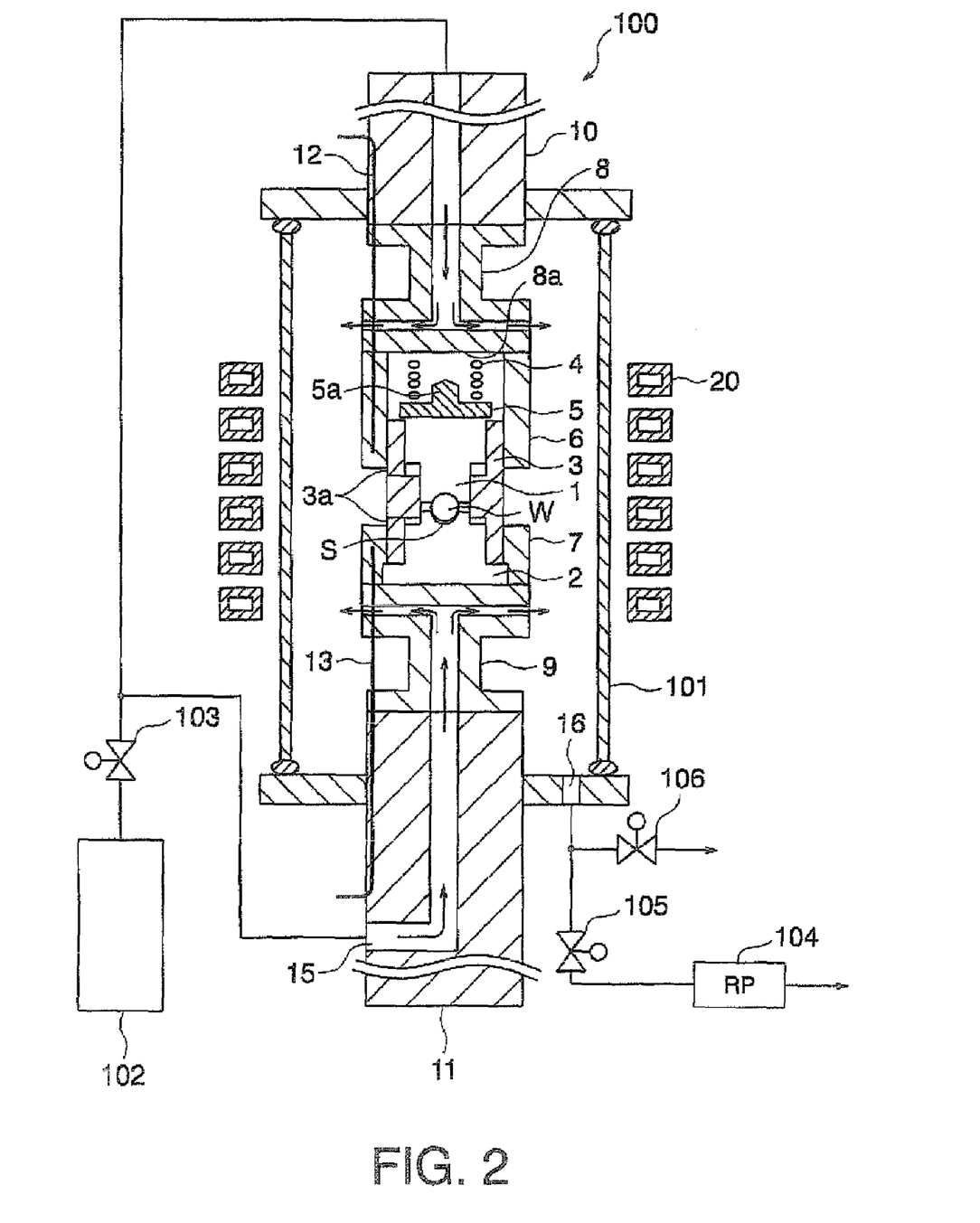
FIG. 2 is a schematic sectional view of an apparatus for producing a glass optical element according to a first embodiment of this invention.

Referring to FIG. 2, an apparatus for producing a glass optical element according to a first embodiment of this invention comprises a forming mold including an upper die 1 and a lower die 2 and a sleeve 3 holding the upper and the lower dies 1 and 2. The upper die 1 and an upper part of the sleeve 3 are received in an upper die heating member 6 to be movable with respect to each other. The lower die 2 and a lower part of the sleeve 3 are fixed in a lower die heating member 7. The sleeve 3 is provided with a plurality of narrow holes 3a to purge a trapped gas from a space S formed inside the sleeve 3 between the upper and the lower dies 1 and 2 and between a glass material W and the lower die 2 to the outside of the sleeve 3.

A compression spring 4 is disposed between the upper die 1 and a lower surface 8a of an upper die supporting member 8. A cap member 5 is interposed between the compression spring 4 and each of the upper die 1 and an upper end face of the sleeve 3. Between the upper die 1 and the lower surface 8a of the upper die supporting member 8, a gap is formed to prevent the compression spring 4 from pressing the upper die 1 while forming is not performed.

The cap member 5 has a lower surface processed into a flat shape having a width adapted to come in contact with the upper die 1 and the upper end face of the sleeve 3. The cap member 5 has a protrusion 5a formed at its upper end and adapted to be brought into point contact with the lower surface 8a of the upper die supporting member 8.

The upper die heating member 6 is fixed to the upper die supporting member 8. The upper die supporting member 8 is fixed to an upper die shaft 10. Thus, the upper die supporting member 8 supports the upper die 1 and the sleeve 3 through the upper die heating member 6. On the other hand, the lower die heating member 7 is fixed to a lower die supporting member 9. The lower dip supporting member 9 is connected to a motor (not shown) through a movable lower die shaft 11 and is driven by the motor to be moved up and down in a vertical direction. The upper die and the lower die heating members 6 and 7 are located at positions such that the upper die and the lower die heating members 6 and 7 cover the upper and the lower dies 1 and 2, respectively, when the upper and the lower dies 1 and 2 are heated.

When the lower die 2 is pushed up by the lower die shaft 11, the upper die 1 moves upward in the upper die heating member 6. Until the cap member 5 is butted against the lower surface 8a of the upper die supporting member 8, the glass material W is subjected to a weak load via the upper die 1 because the compression spring 4 is pushed and compressed. The weak load exerted by the compression spring 4 is the load smaller than a pressing load. The pressing load is the load sufficient to deform the glass material into the desired shape of optical element, which is selected depending upon the composition of the material and the shape of the optical element. The above-mentioned load smaller than the pressing load does not damage the forming mold or a parting film even if the glass material W has a relatively high viscosity before it is heated to a temperature adapted to press-forming or before it is heat-soaked or brought to uniform temperature. Preferably, the weak load exerted by the compression spring 4 is equal to 1/1000 to 1/50 of the pressing load. The compression spring 4 desirably has a spring constant determined so that the compression amount of the compression spring 4 is detected by a position sensor (not shown) and a moving distance of the upper die 1 is easily controlled.

When the lower die 2 is further elevated and the upper die 1 is moved upward inside the upper die heating member 6, the protrusion 5a of the cap member 5 is brought into contact with the lower surface 8a of the upper die supporting member 8. When the lower die 2 is still further elevated, the cap member 5 presses an upper end face of the upper die 1 so that the pressing load is transmitted to the upper and the lower dies 1 and 2. When the lower die 2 and the sleeve 3 are elevated as mentioned above and the lower surface of the can member 5 is brought into contact with the upper end face of the sleeve 3 at a contacting position, pressing is completed at the contacting position as an upper die press end position. Thus, the thickness of the glass material W can be controlled.

The protrusion 5a at the upper end of the cap member 5 has an angled or an arc-shaped section. With this structure, when the protrusion 5a is brought into contact with the lower surface 8a of the upper die supporting member 8, the pressing load is always applied in the vertical direction.

Thus, it is possible to prevent the accuracy of eccentricity of the optical element as a formed product from being degraded due to inclination of a load applying direction.

Each of the upper die 1, the lower die 2, and the sleeve 3 is made of ceramics such as silicon carbide or silicon nitride, cemented carbide, or the like Forming surfaces of the upper and the lower dies 1 and 2 are obtained by precision processing in accordance with the shape of the optical element to be formed.

In this embodiment, a preform as the glass material W to be formed into the optical element has a spherical shape. However, the preform may have any other appropriate shape such as an elliptical shape or a rectangular shape in section. The glass material W may be a glass gob or the like instead of the preform.

Around the upper die and the lower die heating members 6 and 7, a high-frequency induction coil 20 is arranged to heat the upper and the lower dies 1 and 2. Herein, each of the upper die and the lower die heating members 6 and 7 is made of a material easily induction-heated by a high-frequency wave, for example, iron, cobalt, nickel, or tungsten. If the forming mold is made of ceramics, each of the upper die and the lower die heating members 6 and 7 is preferably made of a tungsten alloy having a similar coefficient of thermal expansion.

Preferably, the forming surface of each of the upper and the lower dies 1 and 2 has a parting film. As the parting film, use may be made of a diamond-like carbon film (hereinafter, DLC), a hydrogenated diamond-like carbon film (hereinafter, DLC:H), a tetrahedral amorphous carbon film (hereinafter ta-C), a hydrogenated tetrahedral amorphous carbon film (hereinafter, ta-C:H), an amorphous carbon film (hereinafter, a-C), a hydrogenated amorphous carbon film (hereinafter, a-C:H), a carbon-based film such as a nitrogen-containing carbon film, and an alloy film containing at least one metal selected from a group including platinum (Pt), palladium (Pd), iridium (Ir), rhodium (Rh), osmium (Os), ruthenium (Ru), rhenium (Re), tungsten (W), and tantalum (Ta). In particular, a parting film containing carbon as a main component is preferable because mold release is excellent.

The parting film may be deposited by plasma CVD such as DC-plasma CVD, RF-plasma CVD, microwave plasma CVD and ECR-plasma CVD, optical CVD, laser CVD, ionization deposition, sputtering, ion plating, vapor deposition, and FCA (Filtered Cathodic Arc).

An upper die temperature sensing thermocouple 12 and a lower die temperature sensing thermocouple 13 are inserted into the upper die heating member 6 and the lower die heating member 7 of the forming die, respectively. With reference to measurement results by the thermocouples 12 and 13, a temperature balance between the upper and the lower dies 1 and 2 is monitored and a heating temperature by the high-frequency induction coil 20 is controlled.

A gas supply path 15 is formed through the upper die supporting member 8, the upper die shaft 10, the lower die supporting member 9, and the lower die shaft 11 and is connected to a nitrogen gas supply unit 102 which will later be described. A forming chamber 100 has a vacuum chamber 101 provided with a discharge path 16 formed at a lower part of the vacuum chamber 101 and connected to a vacuum pump 104 which will later be described.

As illustrated in FIG. 2, the forming mold is set in the forming chamber 100 comprising the vacuum chamber 101 formed by a quartz tube. More specifically, the forming mold is confined or enclosed in the vacuum chamber 101 which can be hermetically sealed. The vacuum chamber 101 is openable on upper and lower sides and is lifted upward by a robot (not shown) or the like. By a transfer arm (not shown) or the like, the glass material W is supplied onto the lower die 2.

The forming chamber 100 is supplied with a nitrogen gas from the nitrogen gas supply unit 102 through a nitrogen gas supply valve 103 and the gas supply path 15. The gas supply path 15 includes an upper path for supplying the nitrogen gas through the upper die shaft 10 and an upper part of the upper die heating member 6 and a lower path for supplying the nitrogen gas through the lower die shaft 11 and a lower surface of the lower die heating member 7. The gas supply path 15 is provided with a flow rate controller (not shown).

The vacuum pump 104 and a vacuum valve (discharge valve) 105 are connected to the forming chamber 100 to evacuate the forming chamber 100 into vacuum. The forming chamber 100 is provided with the discharge path 16 for discharging a gas from the inside thereof. The discharge path 16 is connected to the vacuum pump 104 through the vacuum valve 105.

In order to discharge the gas from the forming chamber 100, the nitrogen gas supply valve 103 and a leak valve 106 are closed while the discharging vacuum valve 105 is opened and the vacuum pump 104 is operated. In order to fill the forming chamber 100 with a nitrogen gas atmosphere, the vacuum valve 105 is closed and the nitrogen gas supply valve 103 and the leak valve 106 are opened.

Next, description will be made of a process of forming a glass optical element by the use of the apparatus having the above-mentioned structure.

At first, the vacuum chamber 101 is moved upward. In a state where the lower die 2 is placed below the high-frequency induction coil 20, the upper die 1 and the sleeve 3 are lifted. The glass material W is placed on the forming surface of the lower die 2 and the upper die 1 and the sleeve 3 are set. At this time, a space S is formed between the forming surface of the lower die 2 and the glass material W because the relationship RM/RL>1.0 is satisfied where RM represents a radius of curvature of the glass material W and RL represents a paraxial radius of curvature of the forming surface of the lower die 2 (i.e., a paraxial radius of curvature of the optical element).

Next, the vacuum chamber 101 is lowered and the forming chamber 100 is turned into a closed space. The lower die heating member 7 is elevated to a position where the lower die heating member 7 is heated by the high-frequency induction coil 20. At this time, an upper end of the compression spring 4 is located at a position where the compression spring 4 is out of contact with the lower surface 8a of the upper die supporting member 8. In this state, the forming chamber 100 is repeatedly subjected to evacuation and nitrogen introduction about three times by valve operation. Thereafter, the forming chamber 100 is kept at a normal pressure or a positive pressure. After the forming chamber 100 is filled with the nitrogen gas atmosphere in the above-mentioned manner, the high-frequency induction coil 20 is energized to heat the upper die and the lower die heating members 6 and 7. Thus, the upper and the lower dies 1 and 2, the sleeve 3, and the glass material W placed between the upper and the lower dies 1 and 2 are heated (see I in FIG. 3).

Next, the upper die and the lower die temperature sensing thermocouples 12 and 13 monitor temperatures of the upper and the lower dies 1 and 2, respectively. When a predetermined temperature is reached, a controller (not shown) controls energization to the high-frequency induction coil 20 to start keeping constant temperature.

At any time instant before the temperature is kept constant, the vacuum valve 105 is opened to suck the gas from the forming chamber 100. At this time, the temperature of the glass material W is lower than a press-forming temperature, preferably, not lower than the glass transition point and lower than the press-forming temperature. More preferably, the temperature of the glass material W is not lower than a temperature corresponding to a glass viscosity of $10^{11}$ dPa·s and lower than a temperature corresponding to $10^{8.5}$ dPa·s. Herein, the press-forming temperature is a predetermined temperature within a temperature range corresponding to a viscosity range of $10^{8.5}$ to $10^{8.5}$ dpa·s.

The degree of vacuum in the forming chamber 100 is preferably as low as possible. However, the degree of vacuum of about 0.04 MPa or less is sufficient to achieve the effect of this invention. In this case, by lowering an elevating rate of the lower die 2 at the start of press-forming, a gas trapped in the space S can be discharged. For example, in case where the degree of vacuum is equal to 0.04 MPa and the elevating rate of the lower die 2 upon pressing is 0.5 mm/sec or less, no gas trap mark is observed in the optical element obtained by press-forming. Advantageously, the degree of vacuum is 10 kPa or less, preferably 1 kPa or less. By the above-mentioned evacuation, the trapped gas in the space S is discharged.

Thereafter, the lower die 2 is moved upward and the compression spring 4 is compressed between the cap member 5 and the upper die heating member 6. At this time, the compression amount is determined so as to apply a load such that the space S is closed by the forming surface of the lower die 2 and the surface of the glass material W. Specifically, the compression amount is determined so as to apply a load of 10-500 gf, preferably 100-300 gf to the glass material W. After maintaining the above-mentioned state for a predetermined time period (for example, about 10 seconds), the forming chamber 100 is supplied with the nitrogen gas again so that the atmosphere in the forming chamber 100 is kept at a normal pressure or a positive pressure again. Even in this event, no gas enters into the space S because the lower die 2 and the glass material W are kept in tight contact with each other.

Alternatively, by finely adjusting the load or the moving distance of the lower die 2, it is possible to apply the upper die 1 with a load such that the space S is closed by the forming surface of the lower die 2 and the surface of the glass material W. In this case, the compression spring 4 may be omitted. The cap member 5 is disposed between the upper end face of the upper die 1 and the lower surface 8a of the upper die supporting member 8 without the compression spring 4 interposed therebetween.

Thereafter, the upper and the lower dies 1 and 2 and the sleeve 3 are heated by afterheat and heat-soaked or brought to uniform temperature. Heating is continued until the glass material W reaches a temperature range suitable for press-forming.

Upon forming, it is preferable that the forming surfaces of the upper and the lower dies 1 and 2 and the glass material W are kept at a temperature within a range corresponding to the viscosity range of $10^{8.5}$ to $10^{7.5}$ dpa·s. At this time, an atmospheric gas having a normal pressure or a positive pressure is present in the forming chamber 100 and serves as a medium to efficiently perform heat conduction. Further, temperature control using the thermocouples can stably be performed (see II in FIG. 3).

Thereafter, the lower die 2 is further elevated until the protrusion 5a of the cap member 5 is brought into contact with the lower surface 8a of the upper die supporting member 8. Then, pressing is started.

The elevating rate of the lower die 2 upon pressing is preferably 0.001-1 mm/sec, more preferably 0.01-0.5 mm/sec. The pressing load is preferably 50-300 kgf/cm², more preferably 100-200 kgf/cm². When the lower surface of the cap member 5 presses the upper end face of the upper die 1 and is brought into contact with the upper end face of the sleeve 3 (when pressing is performed to the end), this state is maintained for a predetermined time period (for example, about 20 seconds) (see I in FIG. 3).

Thereafter, cooling is performed. Cooling is carried out by slow cooling at a rate of 30-200° C./min, preferably 50-100° C./min, releasing a load at 500° C. not higher than the transition point and then starting rapid cooling. The cooling rate of the rapid cooling is about 100-300° C./min higher than that of the slow cooling. The cooling rates (slow cooling, rapid cooling) are adjusted by controlling the flow rate of the introduced nitrogen gas using the flow rate controller (not shown) (see IV in FIG. 3).

During cooling, the optical element being formed is heat-contracted. At this time, the optical element is different in coefficient of thermal expansion from the sleeve 3 and the upper and the lower dies 1 and 2. Taking this into account, an allowance is reserved between a flange of the upper die 1 and a step portion of the sleeve 3 to prevent mutual contact therebetween upon pressing to the end in order that the forming surfaces of the upper and the lower dies 1 and 2 are not separated during cooling and that the upper die 1 follows heat contraction of the optical element. With this structure, it is possible to prevent occurrence of sink marks in the optical element and to achieve excellent surface accuracy.

When the temperature is lowered to a predetermined temperature, for example, 100° C., the lower die 2 is lowered below the high-frequency induction coil 20. Introduction of nitrogen is stopped and the vacuum chamber 101 is moved upward. The upper die 1 and the sleeve 3 are lifted and the optical element obtained by press-forming is taken out. Thereafter, a new glass material W is supplied and the upper die 1 and the sleeve 3 are set. Then, a press cycle is repeated.

In the foregoing embodiment, pressing is performed by moving the lower die 2. Alternatively, the upper die 1 may be moved. Further, both the upper and the lower dies 1 and 2 may be moved. The gas introduced into the forming chamber 100 is a nonoxidizing gas which may be a helium gas, a mixture of a nitrogen gas and a hydrogen gas (for example, the ratio of nitrogen being 95% or more), or the like instead of the nitrogen gas.

Alternatively, the glass material W may be heated outside the forming mold to a temperature not lower than the transition point, preferably to a temperature higher than a temperature corresponding to $10^{11}$ dPa·s, and thereafter supplied into the forming mold.

In this embodiment, the space S formed between the forming surface and the glass material W is located on the side of the lower die 2. Alternatively, the space may be formed on the side of the upper die 1 or on the sides of both the upper and the lower dies 1 and 2. In case where the space S is formed on either one side depending upon the relationship in shape between the optical element to be formed and the glass material W, the space S is preferably located on the side of the lower die 2.

If the upper die 1 is too heavy, the space S is closed by the weight of the upper die 1 when the upper die 1 is set after the glass material W is supplied. Therefore, even if the forming chamber 100 is reduced in pressure, the trapped gas is not discharged from the space S. Therefore, the load applied to the glass material W by the weight of the upper die 1 is adjusted such that the upper die 1 is slightly lifted by the pressure of the trapped gas in the space S when the forming chamber 100 is evacuated.

The size of the glass material W used in this invention is not specifically limited. However, a spherical preform high in weight accuracy is preferably used. Further, a hot-formed preform produced by dropping a molten glass is most preferable. Such preform preferably has a volume within a range of 5-70 mm$^3$.

The effect of this invention is remarkable if the relationship RM/RL>1.0, preferably 1.0<RM/RL≦1.6, more preferably, 1.2≦RM/RL≦1.6 is satisfied where RM represents a radius of curvature of the glass material W and RL represents a paraxial radius of curvature of either one surface of the optical element.

This invention can be advantageously implemented in case where either one surface of the optical element has an aspherical shape. However, the shape is not limited thereto but may be a spherical shape. In this case, RL represents a radius of curvature of a spherical surface.

Further, this invention can be advantageously implemented if the glass material W has a spherical shape, but is applicable to a flattened sphere (double convex shape). In this case, RM represents a radius of curvature of the flattened sphere corresponding to a paraxial region of the optical element.

The optical element preferably has an outer diameter of 5 mm or less.

The effect of this invention is remarkable if the optical element has a shape such that the relationship 1<d/f<3 is satisfied where d represents the thickness of the optical element at an optical axis and f represents a focal distance. This is because the above-mentioned correlation between the volume of the glass material and the shape of the optical element easily cause a gas trap mark to occur.

The gas trap mark does not give a critical influence upon optical performance of the optical element if it is sufficiently small. It is desired that the diameter of the gas trap mark is smaller than 200 μm, preferably smaller than 100 μm. According to the method of this invention, even if the forming mold and the glass material has a relationship such that a closed space is formed between the forming mold and the glass material, it is possible to form the optical element without a gas trap mark having a diameter not smaller than 200 μm and present in the vicinity of the surface of the optical element obtained by press-forming.

For example, it is assumed that the optical element has first and second surfaces as curved surfaces and that the optical element has a volume V. Then, if the relationship RM'/RL>1.0 is satisfied where RL represents a paraxial radius of curvature of the first or the second surface and RM' is a value satisfying $(4/3)\pi(RM')^3=V$, then it is possible to produce the glass optical element in which a gas trap mark having a diameter greater than 200 μm is not present in the vicinity of a surface of the optical element.

Herein, the gas trap mark in the vicinity of the surface of the optical element includes an air bubble under the surface of the optical element and a recess formed on the surface. In particular, the effect of this invention Is remarkable when the relationship 1.0<RM'/RL<1.6 is satisfied.

The optical element obtained by press-forming according to this invention is not specifically limited. However, the effect of this invention is remarkable if this invention is applied to press-forming of a high-NA objective lens for use with an optical information recording medium to record/reproduce information or a high NA-lens for optical communication. This is because, in the high-NA lens, the shape having a large surface tilt angle or a small radius of curvature of the first surface is advantageous in view of optical performance. Further, in relation to the thickness of the lens, the radius of curvature of a spherical preform becomes greater than the paraxial radius of curvature of the lens (i.e., the paraxial radius of curvature of the forming surface of the upper die or the lower die) so that the gas trap problem tends to frequently occur.

As the optical element, a non-centering lens which does not require a centering step after press-forming is preferable. In this event, a preform equal in volume to the lens can be used and the number of steps need not be increased.

In particular, the effect of this invention is remarkable when either one of optical functional surfaces (preferably the first surface) of the glass optical element has a numerical aperture NA of 0.7 or more, preferably 0.8 or more. Preferably, the glass optical element according to this invention has at least one aspherical surface. This invention is most suitable for a double-sided aspherical lens.

The aspherical lens may be used in an optical pickup apparatus. Specifically, the aspherical lens may be a single lens used as an objective lens and having a numerical aperture NA of 0.7 or more, preferably 0.8 or more, and a total wavefront aberration WFE of 0.06 λrms or less, preferably 0.04 λrms or less, at a usable wavelength of 380 to 450 nm. The above-mentioned objective lens may be used in an optical pickup apparatus for recording/reproducing information on a high-density optical information recording medium.

For example, as the above-mentioned optical pickup apparatus, there is an apparatus having a light source and an objective lens for converging a luminous flux from the light source to an optical information recording medium. In the apparatus, the light source has a wavelength of 700 nm or less, preferably 500 nm or less.

FIRST EXAMPLE

Description will be made of a first example using the apparatus illustrated in FIG. 2.

Figure 3:
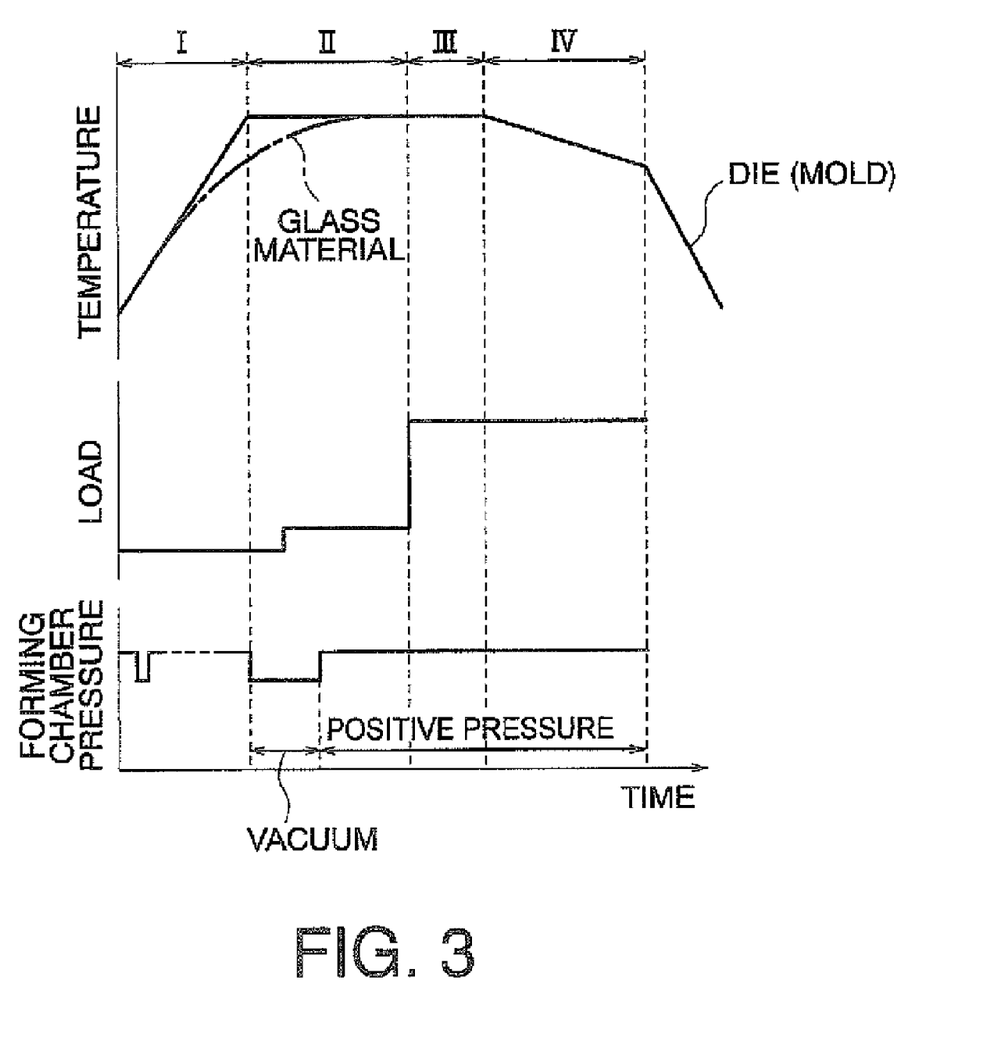
FIG. 3 is a view showing a press schedule in a first example in which a glass optical element is produced by the apparatus illustrated in FIG. 2.

FIG. 3 shows a press schedule in the first example.

In this example, the glass material W had a spherical shape and was produced by polishing an optical glass material having nd=1.69350, vd=53.20, a sagging point of 560° C., and a transition point of 520° C. into a diameter of 2.7 mm.

The glass material W was placed on the forming surface of the lower die 2. The forming surface had a paraxial radius of curvature of 1.1 mm. Next, the upper die 1 and the sleeve 3 were set. The space S was formed between the lower die 2 and the glass material W. The maximum height of the space S at the center was 75 μm. In FIG. 2, the size of the space S is emphasized for convenience of illustration.

A contacting portion at which the lower die 2 and the glass material W were contacted with each other had a diameter of 2.2 mm. The optical element (lens) after press-forming had an outer diameter of 3.1 mm and a thickness of 2.0 mm.

Hereinafter, description will be made of a pressing process using the apparatus having the above-mentioned structure.

After the glass material W was set in the forming mold in the forming chamber 100, the valves 103, 105, and 106 were operated to repeat evacuation and nitrogen introduction three times with respect to the forming chamber 100. Thereafter, when the forming chamber 100 was filled with the nitrogen atmosphere, the high-frequency induction coil 20 was energized to heat the upper die and the lower die heating members 6 and 7. Consequently, the upper and the lower dies 1 and 2, the sleeve 3, and the glass material W were heated. The temperature was monitored by the upper die and the lower die temperature sensing thermocouples 12 and 13 (in fact, the temperature of the glass material rose after a small delay from the die temperatures actually measured (see FIG. 3)). When the temperature reached 530° C. corresponding to the viscosity of $10^{11}$ dpa·s, the forming chamber 100 was evacuated until the degree of vacuum in the forming chamber 10 become equal to about 50 Pa.

Thereafter, the lower die 2 was moved upward and the compression spring 4 was contracted by 1 mm to apply a load of about 250 gf to the glass material W. After this state was maintained for about 10 seconds, the nitrogen gas was introduced into the forming chamber 100 to build up a positive pressure in the forming chamber 100. Then, when the temperature reached 590° C. corresponding to the viscosity of $10^{8.0}$ dPa·s, this temperature was started to be kept constant and uniform. Heat-soaking to keep the die temperatures constant and uniform was continued for 30 seconds. Thereafter, the lower die 2 was elevated at a rate of 0.03 mm/sec and pressing was started. The pressing load was 150 kgf. Upon pressing to the end, this state was maintained for 20 seconds. Thereafter, cooling was performed at a slow cooling rate of 90° C. At a temperature of 500° C. not higher than the transition point, the load was released and rapid cooling was started. After cooling, the lower die 2 was lowered below the high-frequency induction coil 20. Nitrogen introduction was stopped. The vacuum chamber 101 was moved upward. The upper die 1 and the sleeve 3 were removed and the optical element (lens) obtained by press-forming was taken out.

The external appearance of the optical element (lens) produced via the above-mentioned process was observed. As a result, no gas trap mark was observed at all and the forming surface was completely transferred. As optical performance of the lens, the aberration was measured. As a result, the total wavefront aberration was 0.02 to 0.03 λrms at a measured wavelength of 405 nm.

As described above, by evacuating the forming chamber 100 at a temperature around the press-forming temperature, the gas trapped in the space S formed between the glass material W and the lower die 2 is discharged. Thereafter, by pressing the glass material W under a weak load applied by the compression spring 4, the contacting portion between the glass material W and the lower die 2 is hermetically sealed. Therefore, even if the nitrogen gas is introduced again in the above-mentioned state, the nitrogen gas never enters into the space S Further, by heat-soaking in the state where the nitrogen gas is introduced after evacuation, the glass material W entirely reaches a press-formable viscosity and can be pressed under a high pressing load (herein, 150 kgf).

COMPARATIVE EXAMPLES

First Comparative Example

For comparison, the weak load applied by the compression spring 4 during evacuation was replaced by a load equivalent to the pressing load. As a result, the glass material W was broken into pieces and a die material SiC of the lower die 2 was damaged.

Second Comparative Example

Like in the conventional method, the forming chamber 100 was evacuated after the glass material W reached the forming temperature via heat-soaking. Thereafter, pressing was performed. As a result, the optical element (lens) obtained by press-forming had a gas trap mark. The reason is as follows. By heat-soaking, the viscosity of the glass material W was lowered to allow deformation even under the weak load. Therefore, the glass material W was brought into tight contact with the forming surface of the lower die 2. Although the forming chamber 100 was evacuated, the trapped gas was not discharged from the space S.

Third Comparative Example

The above-mentioned forming process was executed without applying the weak load by the compression spring. As a result, a gas trap mark was formed on the optical element (lens). This is because the nitrogen gas entered into the space S when the nitrogen gas was introduced again after evacuation.

Fourth Comparative Example

Heating and pressing were carried out with the forming chamber kept in vacuum. After the thermocouples for temperature measurement detected the press-forming temperature, soaking time was taken and pressing was performed. As a result, the glass material W was not sufficiently heated so that the glass material W was broken and the forming mold was damaged.

In the first example of this invention, evacuation prior to pressing may be started at the timing when the die temperatures are not higher than the transition point of the glass material. However, in order to shorten a forming cycle time, it is advantageous to start evacuation after the glass material W approaches the forming temperature. The degree of vacuum in the forming chamber to be reached by evacuation is preferably as low as possible but 0.04 MPa or less is sufficient. This is because, if the temperature of the glass material W is not higher than the temperature corresponding to the viscosity of $5 \times 10^6$ dPa·s and the elevating rate (pressing rate) of the lower die is not higher than 0.5 mm/sec, the gas trapped in the space S is discharged even if a small amount of the atmospheric gas remains in the forming chamber.

The weak load during evacuation is preferably 50 gf or more in case where the contacting portion between the glass material W and the forming mold has a diameter of 2.2 mm. A smaller load may cause the gas trap mark to occur. The soaking time following introduction of the nitrogen gas after evacuation is 10 seconds or more, preferably 30 seconds or more.

Figure 4:
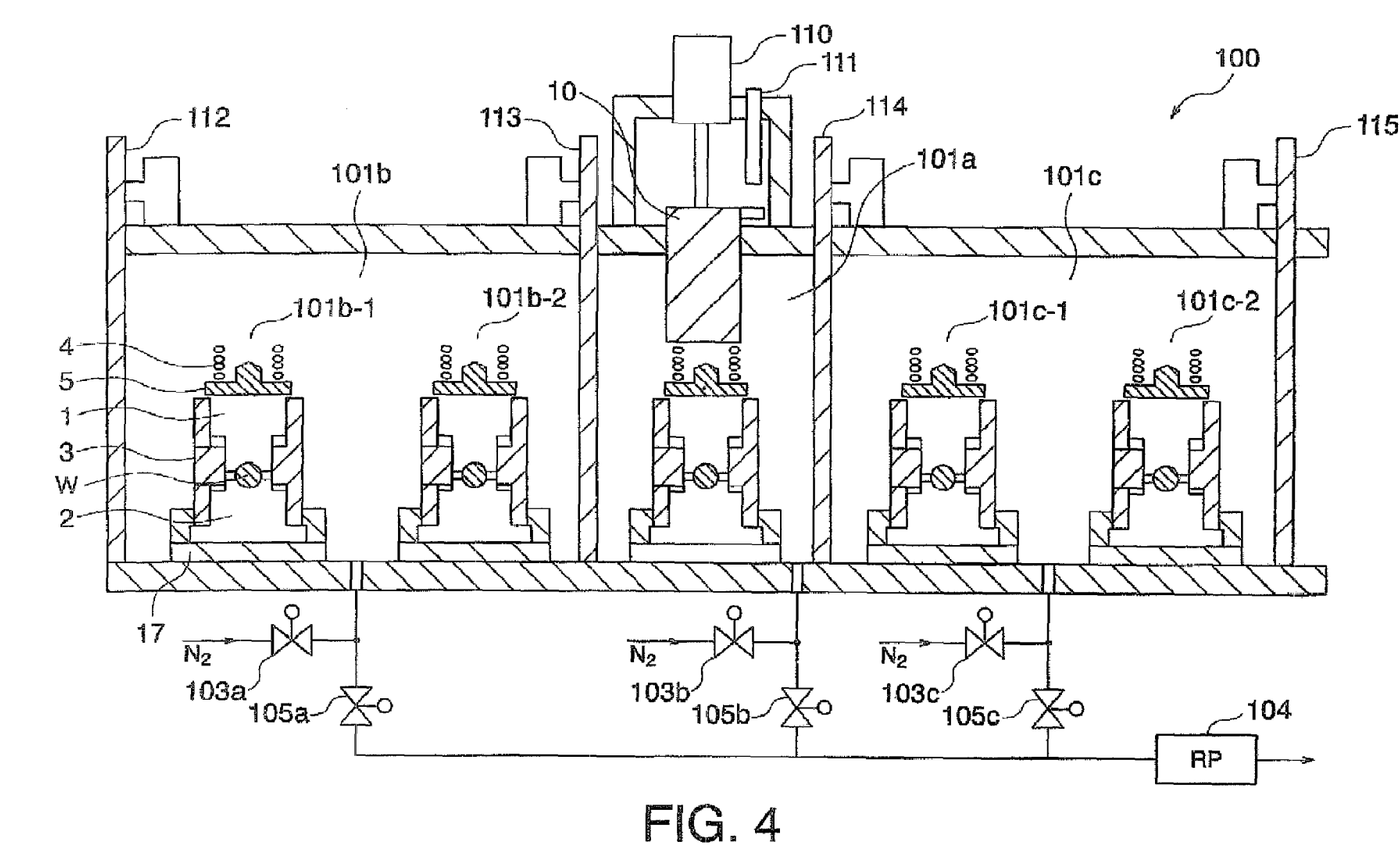
FIG. 4 is a schematic sectional view of an apparatus for producing a glass optical element according to a second embodiment of this invention.

Referring to FIG. 4, description will be made of an apparatus for producing a glass optical element according to a second embodiment of this invention.

In this embodiment, the forming chamber 100 has a pressing chamber 101a, a heating furnace chamber 101b, and a cooling furnace chamber 101c. The forming mold moves in the forming chamber 100 from left to right in FIG. 4 by a rail or a rotary table which is not shown in the figure. Each of the chambers 101a to 101c of the forming chamber 100 is at first evacuated by the vacuum pump 104. After closing valves 105a, 105b, and 105c, nitrogen introduction valves 103a, 103b and 103c are opened to replace the vacuum by the nitrogen gas. Each of the heating furnace chamber 101a and the cooling furnace chamber 101c is kept at a constant temperature by a resistance heater (not shown).

The forming chamber 100 is provided with shutters 112 and 115 at opposite ends thereof. Outside the shutters 112 and 115, preliminary chambers (not shown) are provided, respectively, After exchanging atmospheric air and nitrogen in the preliminary chambers, the forming mold is introduced into and taken out from the forming chamber 100. In this manner, the forming chamber 100 (including the pressing chamber 101a, the heating furnace chamber 101b, and the cooling chamber 101c) is kept at the nitrogen gas atmosphere. Further, shutters 113 and 114 are arranged between the pressing chamber 101a and the heating furnace chamber 101b and between the pressing chamber 101a and the cooling furnace chamber 101c respectively. With this structure, evacuation and nitrogen introduction are carried out in the pressing chamber 101a independently of the heating furnace chamber 101b and the cooling furnace chamber 101c.

SECOND EXAMPLE

Hereinafter, description will be made of a second example using the apparatus illustrated in FIG. 4.

Figure 5:
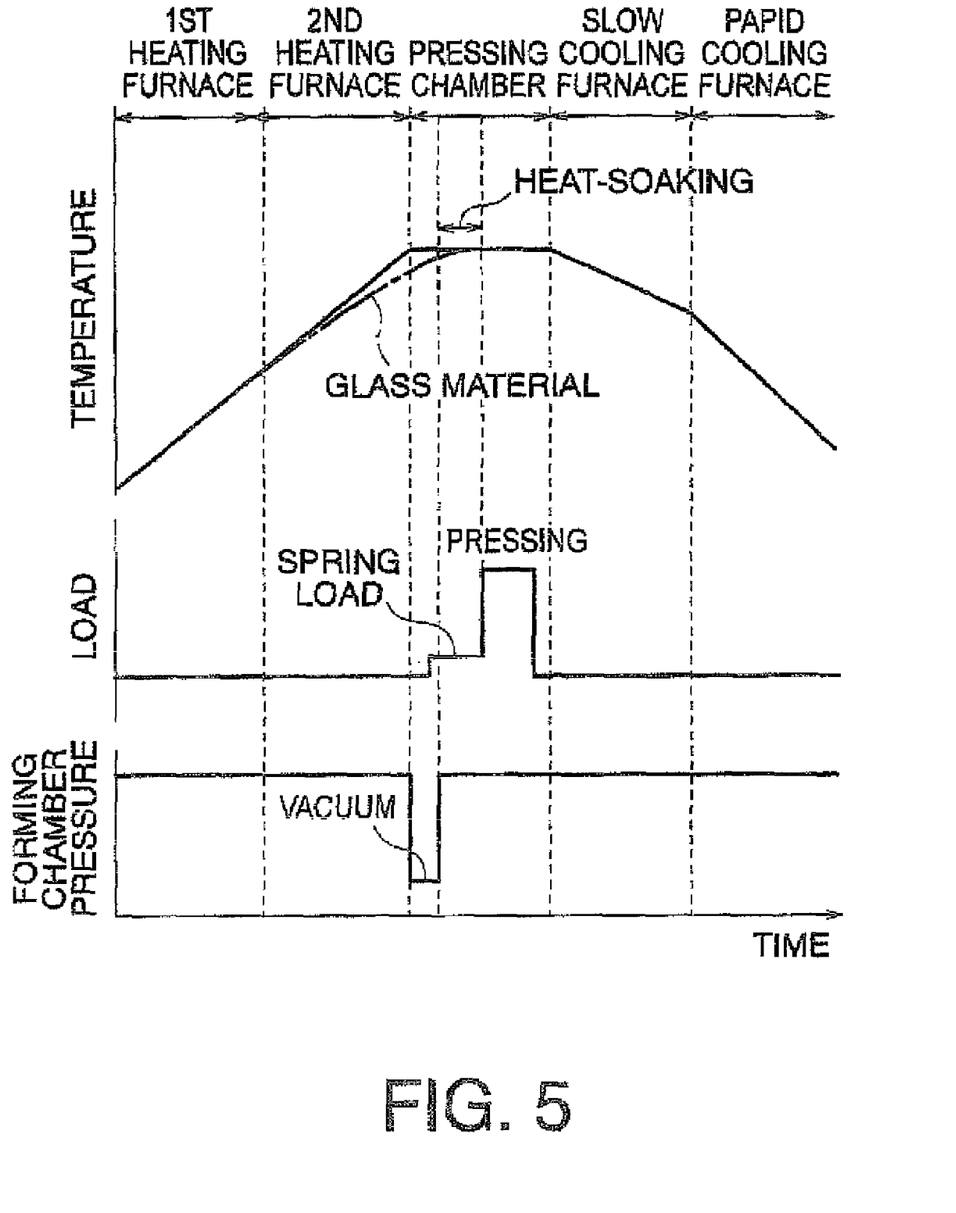
FIG. 5 is a view showing a press schedule in a second example in which a glass optical element is produced by the apparatus illustrated in FIG. 4.

FIG. 5 shows a press schedule in the second example.

The species of the glass material and the shapes of the optical element (lens) and the forming mold are same as those in the first example.

A pressing process in the second example is as follows.

Using a die assembling/disassembling unit (not shown), the glass material W was placed on the lower die 2. Next, the upper die 1 was inserted into the sleeve 3. The forming mold comprising the upper and the lower dies 1 and 2 was put on a die support 17 and loaded into the preliminary chamber (not shown) adjacent to the heating furnace chamber 101b. After evacuation, the nitrogen gas was introduced into the preliminary chamber to perform gas exchange. After completion of gas exchange into the nitrogen gas, the shutter 112 was opened. The forming mold together with the die support 17 was transferred into the heating furnace chamber 101b. A first heating furnace 101-b of the heating furnace chamber 101b was kept at 700° C. After heating at the first heating furnace 101b-1 for 100 seconds, the forming mold was transferred to a second heating furnace 101b-2. The second heating furnace 101b-2 was kept at 630° C. After heating at the second heating furnace 101b-2 for 100 seconds, the die support 17 was heated to a temperature of 580° C. corresponding to the viscosity of $10^{8.5}$ dPa·s.

Next, the shutter 113 was opened and the forming mold together with the die support 17 was transferred to the pressing chamber 101a kept at 640° C. The shutter 113 was closed. At this time the shutter 114 was closed also. Then, the valve 105b was opened to evacuate the pressing chamber 101a so that the degree of vacuum was equal to about 50 Pa. As a result, the trapped gas was discharged from the space S in the lower die 2.

Then, a press head 10 (an upper die shaft) was lowered to a position such that the compression spring 4 was compressed by 1 mm. The lowering distance was measured by a position sensor 111. The spring constant was 250 gf/mm so that the pressing load of 250 gf was applied. After maintaining this state for about 10 seconds, the nitrogen gas introduction valve 103b was opened to introduce the nitrogen gas into the pressing chamber 101a. At this time, the glass material W and the lower die 2 were hermetically sealed to each other so that no gas entered into the space S. When the temperature reached 590° C. corresponding to the viscosity of $10^{8.0}$ dPa·s, heat-soaking for keeping the die temperatures constant and uniform was performed for 30 seconds. Thereafter, the press head 10 was lowered at a rate of 0.03 mm/sec to start pressing. The pressing load was 150 kgf. At the press end position, the press head 10 was maintained for 20 seconds.

The press head 10 was elevated and the shutter 114 was opened. The die support 17 was transferred to the cooling furnace chamber 101c A first cooling furnace (slow cooling furnace) 101c-1 of the cooling furnace chamber 101c was maintained at 450° C. After cooling at the first cooling furnace 101c for 100 seconds, the die support 17 was transferred to a second cooling furnace (rapid cooling furnace) 101c-2. After lapse of 100 seconds, the forming mold was disassembled after passing through the preliminary chamber (not shown) and the lens as the glass optical element was taken out.

The external appearance of the optical element (lens) produced via the above-mentioned process was observed. As a result, no gas trap mark was observed at all and the forming surface was completely transferred. As optical performance of the optical element (lens), the aberration was measured. As a result, the total wavefront aberration was 0.02 to 0.03 λrms at a measured wavelength of 405 nm.

Like in the first example, evacuation may be started at a temperature lower than that in the above-mentioned condition. In this case, however, the cycle time was lengthened.

As described above, in the second example also, the optical element excellent in surface quality without the gas trap mark can be obtained like in the first example. If forming molds are simultaneously set in the respective furnaces in one-to-one correspondence, it is possible to produce the optical element in a forming cycle time not longer than 100 seconds. Further, by setting a plurality of forming molds in each furnace and using a plurality of press heads equal in number to the forming molds, mass production is realized at a low cost.

This invention is applicable to press forming of formed products required to have high forming accuracy, in particular, to press forming of optical lenses for use in a digital camera and an optical pickup for recording and reproducing information on an optical recording medium such as a DVD.

While this invention has thus far been described in connection with the preferred embodiments thereof, it will readily be possible for those skilled in the art to put this invention into practice in various other manners without departing from the scope set forth in the appended claims.

What is claimed is:

1. A glass optical element having a first surface and a second surface as curved surfaces, wherein:
    the glass optical element has a volume V and satisfies a relationship RM'/RL>1.0 where RL represents a paraxial radius of curvature of the first or the second surface and RM' is a value satisfying $(4/3)\pi(RM')^3=V$;
    a gas trap mark in the vicinity of a surface of the glass optical element being not greater in diameter than 200 µm.

2. A glass optical element produced by the method according to claim 1, wherein:
    the glass optical element is an objective lens having a numerical aperture NA of 0.7 or more and a total wavefront aberration WFE of 0.06 λrms at a usable wavelength of 380-450 nm.

3. A glass optical element according to claim 2 wherein:
    relationship, 1.0<RM/RL,<1.6 is satisfied.

4. A glass optical element according to claim 2, wherein:
    the glass optical element is made of a glass material press-formed by a forming mold.

5. A glass optical element according to claim 2, wherein:
    the glass optical element is made of a glass material press-formed by a forming mold.

6. A glass optical element according to claim 1 wherein: relationship, 1.0<RM/RL,<1.6 is satisfied.

7. A glass optical element according to claim 1, wherein: the glass optical element is made of a glass material press-formed by a forming mold.

8. A glass optical element according to claim 1, wherein: the glass optical element is made of a glass material press-formed by a forming mold.

* * * * *

UNITED STATES PATENT AND TRADEMARK OFFICE
CERTIFICATE OF CORRECTION

PATENT NO. : 7,336,424 B2
APPLICATION NO. : 11/744965
DATED : February 26, 2008
INVENTOR(S) : Yasuhiro Yoneda It is certified that error appears in the above-identified patent and that said Letters Patent is hereby corrected as shown below:

Claim 2:
Column 16, line 53, please delete "produced by the method".

Claim 5:
Column 16, lines 64-66, please delete claim 5 in its entirety.

Claim 8:
Column 18, lines 1-3, please delete claim 8 in its entirety.

Signed and Sealed this

Twenty-seventh Day of October, 2009

David J. Kappos
*Director of the United States Patent and Trademark Office*